Nov. 25, 1958
M. S. KATOW ET AL
2,861,694
DECANTING PIPE FOR GRIT REMOVAL SYSTEM
Filed Jan. 8, 1954
2 Sheets-Sheet 1
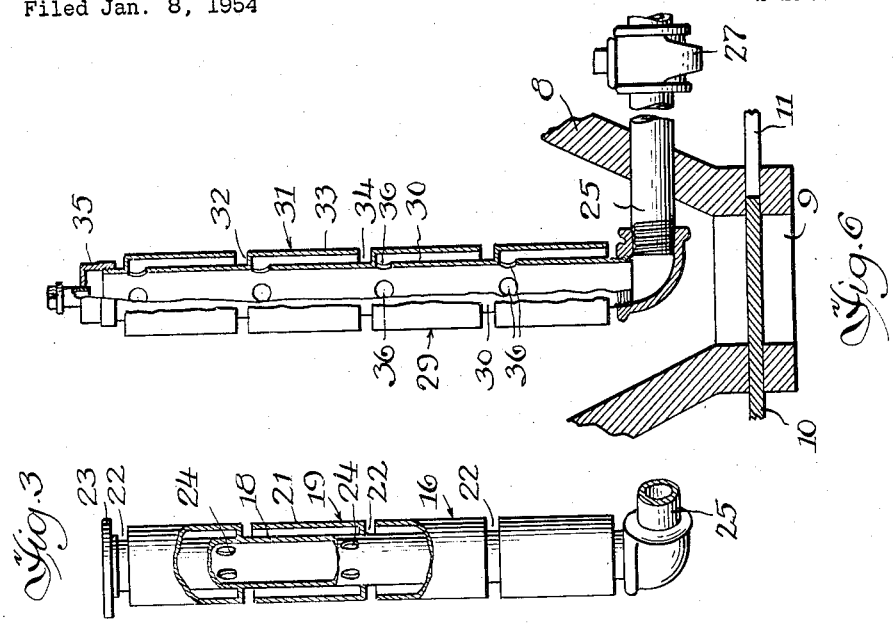
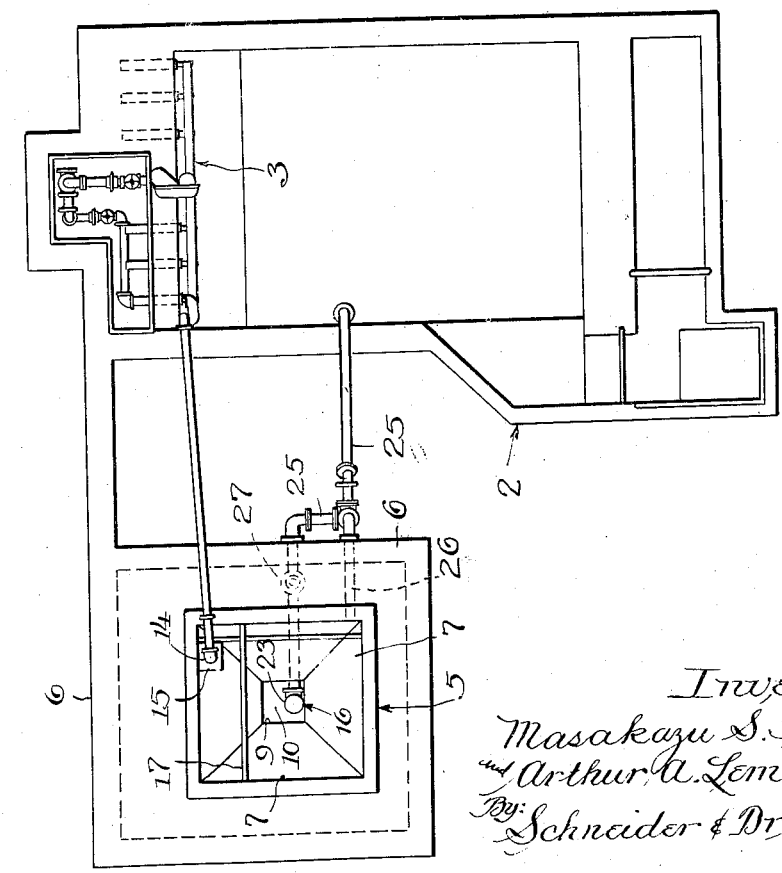
Inventors,
Masakazu S. Katow,
and Arthur A. Lemke,
By: Schneider & Dressler,
Attys.

Nov. 25, 1958 M. S. KATOW ET AL 2,861,694
DECANTING PIPE FOR GRIT REMOVAL SYSTEM
Filed Jan. 8, 1954 2 Sheets-Sheet 2
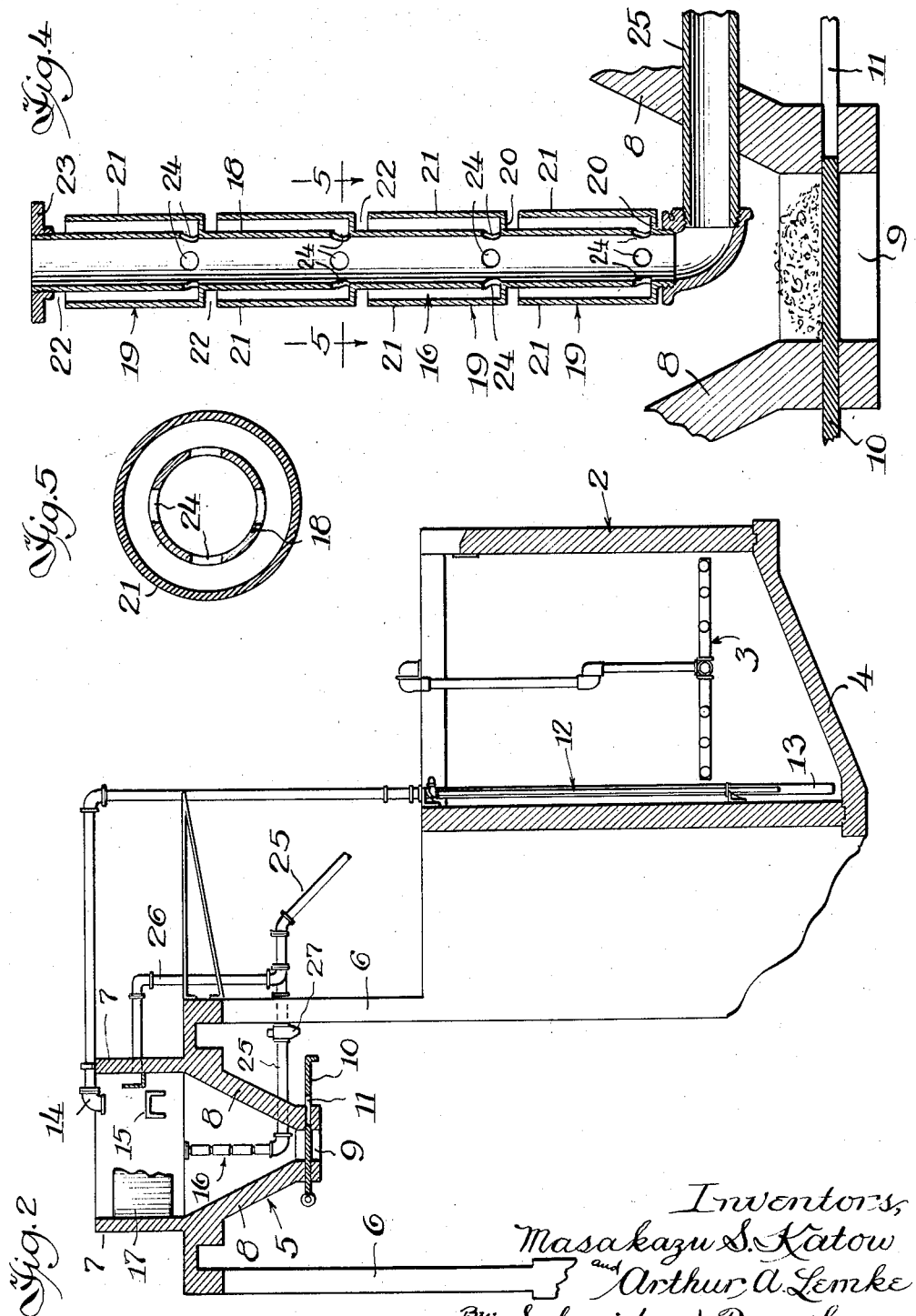
Inventors,
Masakazu S. Katow
and Arthur A. Lemke
By: Schneider & Dressler,
Attys.

United States Patent Office 2,861,694
Patented Nov. 25, 1958

2,861,694

DECANTING PIPE FOR GRIT REMOVAL SYSTEM

Masakazu S. Katow, Los Angeles, Calif., and Arthur A. Lemke, Chicago, Ill., assignors to Chicago Pump Company, a corporation of Delaware Application January 8, 1954, Serial No. 402,908

9 Claims. (Cl. 210—534)

This invention relates to a decanting pipe for a grit removal system, and is particularly concerned with means for separating liquid from grit with which it is removed from a sewage treatment system.

In most modern sewage treatment systems the grit and other solid matter that cannot be dissolved by organic action is separated from the sewage as the first step in the process of treating the sewage. One method by which the grit and other solid matter may be removed is by an air lift which pumps it out of the grit tank into which the raw sewage flows. This method is very efficient and is in commercial use, but it has one disadvantage in that liquid sewage is also removed by the air lift along with the grit and other solids. In accordance with the present invention the grit and some liquid sewage is pumped out of the grit tank into a decanting tank. The liquid sewage is separated from the grit by a decanting pipe and is then piped back to the grit tank or to the primary tank. The grit is then removed from the decanting tank in any suitable manner.

The structure by which the above and other advantages are attained will be described in detail in the following specification, taken in conjunction with the accompanying drawings, showing two preferred illustrative embodiments of the invention, in which:

Fig. 1 is a top plan view showing a grit tank and a decanting tank provided with a decanting pipe embodying the invention;

Fig. 2 is a fragmentary cross sectional view of the structure shown in Fig. 1;

Fig. 3 is a side elevational view of one embodiment of the decanting pipe, with portions broken away to illustrate its structure;

Fig. 4 is a vertical sectional view of the decanting pipe and bottom of the decanting tank;

Fig. 5 is a cross-sectional view, taken along the line 5—5 of Fig. 4; and

Fig. 6 is a vertical view, partly in section and partly in elevation, showing the bottom of the decanting tank and another embodiment of decanting pipe.

Referring to Figs. 1 and 2 of the drawings, the reference numeral 2 indicates a grit tank having an air diffusion unit 3 mounted adjacent one end thereof. The air from the air diffusion unit induces a circulatory movement of the sewage in tank 2 which causes the grid and other heavy solids to settle on the bottom of the tank. As shown in Fig. 2, the bottom wall 4 of the grit tank slopes in one direction so that the heavy solids, such as grit, accumulate on the bottom adjacent one side of the tank. A decanting tank 5 is positioned adjacent the grit tank and is supported by walls 6. The decanting tank includes four vertical walls 7 and funnel-shaped walls 8 depending therefrom and provided with a discharge opening 9 at the bottom. A sliding gate 10 having an opening 11 is slidably mounted on the bottom of tank 5. The gate 10 normally closes the bottom of discharge opening 9, but may be slid to align opening 11 with opening 9 so that the grit and other inorganic solids may be dumped from tank 5 into a suitable receptacle positioned under opening 9.

An air lift comprising a pipe 12 has one end 13 positioned in the area in which the grit is accumulated. The other end 14 of pipe 12 is positioned over a splash plate 15 secured in tank 5 in any suitable manner. As the grit is pumped into decanting tank 5 by air lift 12, the grit and liquid with which it is mixed falls on splash plate 15 and into decanting tank 5.

The decanting pipe 16 is centrally disposed in tank 5 and a baffle 17 extends between two of the vertical walls 7. The vertical plane of baffle 17 is between splash plate 15 and decanting pipe 16 so that the mixture of grit and liquid discharged from opening 14 cannot pass directly into the decanting pipe. The baffle provides a quiescent zone in tank 5 surrounding pipe 16 so that the grit and other heavy solids can settle on gate 10 at the bottom of tank 5. The pipe 16 comprises an inner wall 18 and a plurality of tubular shields 19 surrounding wall 18 in vertically spaced relationship to each other. Each shield 19 has a transverse bottom wall 20 extending laterally outwardly from wall 18, and a vertical wall 21, the upper edge of which terminates a short distance below the bottom wall 20 of the shield directly above, to provide a gap 22 between each of the adjacent shields. A flange 23 extends outwardly from wall 18 just above the top edge of the uppermost shield 19 to provide a gap 22. The flange 23 is wider than shield 19 so that grit and other solids cannot fall into the uppermost shield 19.

As the mixture of grit and liquid is discharged from the end 14 of air lift 12 the grit settles to the bottom of the tank, and the liquid flows through the gaps 22 and down between the vertical wall 21 of the shields and the inner wall 18. The inner wall 18 is provided with a plurality of orifices 24 just above the bottom wall 20 of each shield 19 and the liquid passes through these orifices into the inner section of pipe 16. The gaps 22 provided at vertically spaced levels are each small enough to prevent the liquid flowing into pipe 16 from disturbing the quiescence of the mixture of grit and liquid in tank 5. A pipe 25 connected to the bottom of the inner section of pipe 16 carries this liquid back to the grit tank or to the primary tank. An overflow pipe 26 extends from the upper section of tank 5 through one wall 7 to the pipe 25 to carry any excess liquid from tank 5. An effluent weir spaced inwardly from the wall through which overflow pipe 26 extends serves to maintain the desired liquid level in the decanting tank. The tank 5 is at a higher level than the grit tank 2 to permit the liquid to flow through pipe 25 by gravity. Pipe 25 is provided with a shut-off valve 27 which normally remains open while the grit removal system is in operation.

The decanting pipe 29 shown in Fig. 6 is used with the same structure as decanting pipe 16, and the same reference numerals are used to designate identical structure. Decanting pipe 29 comprises an inner wall 30 and a plurality of tubular shields 31 surrounding wall 30 in vertically spaced relationship to each other. Shields 31 each have a transverse top wall 32 extending laterally outwardly from wall 30, and a vertical wall 33, the lower edge of which terminates a short distance above the top wall 32 of the shield directly below, to provide a gap 34 between each of the adjacent shields. The upper end of pipe 29 is closed by a cap 35 secured thereto in any suitable manner, as, for example, by interengaging threads.

The inner wall 30 is provided with a plurality of orifices 36 just below the top wall 32 of each shield. In this embodiment valve 27 is kept closed, and the liquid flowing into gaps 34 is forced upwardly between the shields 31 and pipe 30 by the pressure. The liquid spills into the inner section of pipe 29 as it reaches the orifices 36. At intervals the valve is opened and the liquid flows through pipe 25 by gravity, as in the other embodiment. When pipe 29 is emptied valve 27 is closed and the liquid again starts flowing upwardly between the shields 31 and wall 30.

In both embodiments illustrated the decanting pipe has been shown as a separate unit centrally disposed relative to tank 5. If desired, the decanting means could be incorporated integrally into the wall structure of tank 5. In this event it would be desirable to position the decanting means adjacent a section of wall 8 separated from discharge end 14 of air lift 12 by a baffle similar to baffle 17. This arrangement would provide a quiescent zone adjacent the decanting means so that no grit would flow with the liquid through the decanting means.

Although we have described two preferred embodiments of our invention in considerable detail, it will be understood that the description thereof is intended to be illustrative, rather than restrictive, as many details of the structure may be modified or changed without departing from the spirit or scope of the invention. For example, the structure is described in relation to its use in connection with a sewage treatment system, but it is obvious that the decanting pipe may be useful in separating liquid from solid matter in different environments, wherever it is desirable to draw off liquid matter from a quiescent mixture of liquid and solid without disturbing the quiescence of the mixture. Accordingly, we do not desire to be restricted to the exact details of construction described.

We claim:

1. A decanting pipe comprising an inner section and a plurality of vertically spaced shields surrounding said inner section, each of said shields having a vertical wall spaced uniformly from said inner section and a transverse wall connecting said vertical wall to said inner section, said shields being spaced vertically a distance small enough to normally prevent flow of solid matter into the space between each shield and said inner section, and a plurality of orifices in said inner section adjacent the transverse wall of each shield to permit liquid to flow from the space between said shields and said inner section into said inner section.

2. A decanting pipe comprising an inner section and a plurality of vertically spaced shields surrounding said inner section, each of said shields consisting of a vertical wall and a top wall connecting said vertical wall to said inner section, the lower edge of each of said shields being positioned above the top wall of the adjacent shield a distance small enough to normally prevent flow of solid matter into the space between each shield and said inner section, and a plurality of orifices in said inner section immediately below each of said top walls to permit liquid to flow from the space between said shields and said inner section into said inner section.

3. A decanting pipe comprising an inner section and a plurality of vertically spaced shields surrounding said inner section, each of said shields having a vertical wall spaced uniformly from said inner section and a bottom wall connecting said vertical wall to said inner section, the upper edge of each of said shields being positioned below the bottom wall of the adjacent shield a distance small enough to normally prevent flow of solid matter into the space between each shield and said inner section, and a plurality of orifices in said inner section immediately above each of said bottom walls to permit liquid to flow from the space between said shields and said inner section into said inner section.

4. A decanting pipe comprising an inner section and a plurality of vertically spaced shields surrounding said inner section, each of said shields having a vertical wall and a bottom wall connecting said vertical wall to said inner section, the upper edge of each of said shields being positioned below the bottom wall of the adjacent shield a distance small enough to normally prevent flow of solid matter into the space between each shield and said inner section, a flange extending laterally from said inner section over the top edge of the vertical wall of the uppermost shield to normally prevent flow of solid matter into the space between said uppermost shield and said inner section, and a plurality of orifices in said inner section immediately above each of said bottom walls to permit liquid to flow from the space between said shields and said inner section into said inner section.

5. In a tank for receiving a mixture of liquid and solid matter, an inlet opening for discharge of said mixture into said tank, a decanting pipe mounted in said tank, a baffle extending transversely of said tank between said inlet and said decanting pipe to provide a quiescent zone adjacent said pipe, said pipe comprising an inner section having a discharge opening outside said tank and a plurality of cylindrical shields surrounding said inner section, said shields being spaced vertically along said inner section with a small gap between adjacent shields, a transverse wall connecting each of said shields with said inner section, and a plurality of orifices in said inner section adjacent each of said transverse walls.

6. In a tank for receiving a mixture of liquid and solid matter, an inlet opening for discharge of said mixture into said tank, a decanting pipe mounted in said tank, a baffle extending transversely of said tank between said inlet and said decanting pipe to provide a quiescent zone adjacent said pipe, said pipe comprising an inner section having a discharge opening outside said tank and a plurality of cylindrical shields surrounding said inner section, said shields being spaced vertically along said inner section with a small gap between adjacent shields, a transverse wall connecting each of said shields with said inner section, a plurality of orifices in said inner section adjacent each of said transverse walls, an opening in the bottom of said tank for discharge of solid matter from which liquid has been removed, and a gate normally closing said last mentioned opening.

7. In a tank for receiving a mixture of liquid and solid matter, an inlet opening for discharge of said mixture into said tank, decanting means mounted in said tank, a baffle extending transversely of said tank between said inlet and said decanting means to provide a quiescent zone adjacent said decanting means, said decanting means having a plurality of orifices permitting the flow of liquid therethrough, a discharge opening leading from said decanting means outside said tank, and a plurality of shields spaced uniformly from said decanting means to protect said orifices, said shields being spaced vertically of said decanting means with a small gap between adjacent shields to permit the flow of liquid from said tank through said orifices.

8. In a tank for receiving a mixture of liquid and solid matter, an inlet opening for discharge of said mixture into said tank, decanting means mounted in said tank, a baffle extending transversely of said tank between said inlet and said decanting means to provide a quiescent zone adjacent said decanting means, said decanting means having a plurality of orifices and a discharge opening, said discharge opening leading outside said tank, shielding means adjacent said decanting means to shield said orifices from the solid matter in said mixture, said shielding means being spaced uniformly from said decanting means and having small openings out of register with said orifices to permit the flow of liquid from said tank through said orifices, an opening in the bottom of said tank for discharge of solid matter from which liquid has been removed, and a gate normally closing said last mentioned opening.

9. In an apparatus for treating sewage, a grit tank, an air diffusion unit in said tank, said air diffusion unit inducing a circulatory movement of sewage in said tank whereby grit mixed with the sewage settles on the bottom of said tank, a decanting tank positioned adjacent said grit tank, an air lift operable to transfer said grit and some liquid sewage from said grit tank to said decanting tank, a decanting pipe in said decanting tank, said decanting pipe having a plurality of orifices to permit said liquid to flow from said decanting tank into said pipe, means to prevent entrance of grit into said pipe, a discharge pipe leading from said decanting tank to said grit tank, a discharge opening in the bottom of said decanting tank, and a movable gate closure for said last mentioned discharge opening.

References Cited in the file of this patent

UNITED STATES PATENTS

| | | |
|---|---|---|
| 609,269 | Etheridge | Aug. 16, 1898 |
| 2,077,074 | Schneible | Apr. 13, 1937 |
| 2,098,608 | Berges | Nov. 9, 1937 |
| 2,308,670 | Bolton | Jan. 19, 1943 |
| 2,425,932 | Green et al. | Aug. 19, 1947 |
| 2,532,457 | Morgan et al. | Dec. 5, 1950 |
| 2,570,304 | Bach | Oct. 9, 1951 |
| 2,593,036 | Koch | Apr. 15, 1952 |
| 2,616,848 | Griffith | Nov. 4, 1952 |
| 2,679,477 | Kivari et al. | May 25, 1954 |
| 2,692,051 | Webb | Oct. 19, 1954 |

FOREIGN PATENTS

| | | |
|---|---|---|
| 498,313 | France | Oct. 14, 1919 |